United States Patent
Braunger et al.

(10) Patent No.: US 7,052,609 B2
(45) Date of Patent: May 30, 2006

(54) METHOD FOR REGENERATION OF ADSORBENT MATRICES

(75) Inventors: Gabriele Braunger, Schemmerhofen (DE); Jan Feuser, Biberach (DE); Joachim Walter, Mittelbiberach (DE)

(73) Assignee: Boehringer Ingelheim Pharma GmbH & Co. KG, Ingelheim (DE)

( * ) Notice: Subject to any disclaimer, the term of this patent is extended or adjusted under 35 U.S.C. 154(b) by 115 days.

(21) Appl. No.: 10/916,053

(22) Filed: Aug. 11, 2004

(65) Prior Publication Data
US 2005/0056592 A1    Mar. 17, 2005

(30) Foreign Application Priority Data
Aug. 11, 2003  (EP) ................... 03018268

(51) Int. Cl.
*B01D 15/08* (2006.01)
(52) U.S. Cl. ............... 210/635; 210/656; 210/198.2; 502/403
(58) Field of Classification Search ............ 210/635, 210/656, 659, 657, 674, 198.2; 502/403, 502/439
See application file for complete search history.

(56) References Cited

U.S. PATENT DOCUMENTS 3,900,422 A * 8/1975 Terajima et al. ............ 502/402
4,013,585 A * 3/1977 Terajima et al. ............. 502/7
4,663,051 A * 5/1987 Flynn et al. ................ 210/675
2003/0186807 A1* 10/2003 Porath et al. ............... 502/403

FOREIGN PATENT DOCUMENTS

WO     WO 01/27623 A2    4/2001

OTHER PUBLICATIONS

"Streamline rProtein A" Amersham Biosciences, 2002, pp. 1-6, XP002233246.
Kenny Sproule, et al. "New Strategy for the Design of Ligands for the Purification of Pharmaceutical Proteins by Affinity Chromatography", Journal of Chromatography B, vol. 740, 2000 pp. 17-33.
Jennifer M. Sokol, et al. "Aprotinin conformational distributions during reversed-phase liquid chromatography analysis by hydrogen-exchange mass spectrometry", Journal of Chromatography A, vol. 1007, 2003, pp. 55-66.

* cited by examiner

*Primary Examiner*—Ernest G. Therkorn
(74) *Attorney, Agent, or Firm*—Michael Morris; Mary-Ellen M. Devlin; David A. Dow

(57) ABSTRACT

The present invention relates to the regeneration of adsorbent matrices that are used for the purification of substances from aqueous liquid samples derived from biological material. The method is adapted to adsorbent matrices that are sensitive to hydrolysis either because of a sensitive base matrix or a sensitive ligand including also a sensitive spacer and is characterized in contacting at least one regeneration solution with the adsorbent matrix which comprises an organic solvent which is water-miscible and has a pH value $\leq 4$, preferably $\leq 3$ (acid solution) or $\geq 10$ but $<13$ (alkaline solution).

19 Claims, No Drawings

METHOD FOR REGENERATION OF ADSORBENT MATRICES

This application claims benefit to EP 03018268.7 filed Aug. 11, 2003.

TECHNICAL FIELD

The present invention relates to the regeneration of adsorbent matrices that are used for the purification of substances from aqueous liquid samples derived from biological material. The method is adapted to adsorbent matrices that are sensitive to hydrolysis either because of a sensitive base matrix or a sensitive ligand including i.e. matrices having a proteineous ligands, and also a sensitive spacer.

BACKGROUND OF THE INVENTION

This kind of processes comprises bringing a porous or non-porous adsorbent matrix that exposes on its outer and/or inner (pore) surfaces a structure that is capable of binding to a desired substance into contact with an aqueous liquid sample derived from the appropriate biological material. The conditions are selected such that the desired substance becomes bound to the structure. In a subsequent step the substance is desorbed/eluted from the matrix and collected. Between the adsorption/binding step and the desorption/elution step there may be one or more washing steps that primarily will remove loosely held material derived from the sample. This latter material may for instance be non-adsorbed/non-bound material present in the liquid within the pores and/or in the interstitial liquid if the matrix is a bed of particles.

In order to make this kind of processes economically feasible there is mostly an imperative need to reuse the adsorbent matrix in several cycles of the same process, e.g. more than 50 cycles, such as more than 75 or 100 cycles. This means that the adsorbent matrix shall not be altered to any significant degree during the individual steps and/or cycles. Factors such as dynamic binding capacity, break through or total availability capacities for the desired substance, rigidity, porosity etc should be essentially constant between the cycles.

In a typical sample to be processed there are also compounds other than the desired substance that will attach to the adsorbent matrix during the adsorption step. One way of getting rid of these other material prior to a subsequent cycle has been to use solutions of guanidinium hydrochloride, urea, aqueous sodium hydroxide or hydrochloride at high concentrations.

Typical hydrolysis sensitive matrices are based on silica and/or saccharide structure. Typical binding structures that are sensitive to hydrolysis may contain peptide, saccharide and/or nucleic acid structure. Most critical are matrices having proteineous ligands. For binding structures/matrices that are sufficiently inert towards hydrolysis, the method of choice has been cleaning with aqueous sodium hydroxide (0.1 M or more such as more than 0.5 M or more than 1.0 M) when disturbing amounts of contaminants have assembled on the adsorbent matrix, typically after several cycles. In this latter case each cycle has in addition comprised a milder cleaning or regeneration step, for instance with a concentrated solution of a compound that compete with the substance for binding to the structure (concentrated salt solution when the binding is based on ion exchange). Alternatively regeneration/cleaning has taken place with acid solutions (e.g. 0.1 M or such as more than 0.5 M HCl). For hydrolysis sensitive materials the agents of choice have been concentrated solutions of urea or guanidinium hydrochloride.

In particular liquid samples containing adherent substances such as lipids, lipoproteins, hydrophobic proteins and other lipoid substances are problematic because they have a severe tendency to stick to the matrices thereby clogging inter-particle as well as intra-particle pores and/or otherwise blocking the binding structures. It has previously been suggested to clean adsorbent matrices from this kind of material by treatment with pure solvents such as ethanol and isopropanol. The use of organic solvents tends to create a new problem because they often precipitate salts and proteins. Even if organic solvents assist in getting rid of adherent material they will increase the risk for clogging by precipitates.

Concentrated solutions of guanidinium hydrochloride are highly corrosive meaning that they may create severe problems on reactors, tubings and connections, in particular if made of steel. In addition there are costs associated with wastes containing these agents and/or with their reuse. Concentrated acid or alkaline solutions, such as 0.1 to 0.5 M hydrochloride or 0.5 to 1 M sodium hydroxide are highly hydrolytic, and therefore can only be used to clean structure/matrices highly inert to hydrolysis.

The prior use of concentrated ethanol and isopropanol, which means in concentrations above 50% (v/v), also presents an explosion problem.

Furthermore, use of the concentrated regeneration solutions known in the art, such as 3 to 6 molar urea or guanidinium hydrochloride is caused in a further problem. The use of concentrated regeneration solutions due to high buffer consumption, especially when the chromatographic process is performed in a fluidized (=expanded) bed mode (EB mode). Displacement of the high concentrated (=high density) regeneration solution by a low density buffer, which is needed for re-use of the chromatography matrix, results in turbulences within the column. The flow direction in fluidized EB mode columns is from bottom to top. Therefore, the more denser solution tends to mix with the more lower density buffer due to gravity. As a result, displacement of the more denser solution is triggered by dilution and not by plug flow behavior, which leads to a significant higher buffer consumption.

OBJECTIVES OF THE INVENTION

The first and main objective is to design an improved regeneration protocol for the processes discussed above, preferably for regeneration of structures/matrices which are sensitive to hydrolysis i.e. in alkaline or acid aqueous media (e.g. at a pH <4, preferably <3, more preferably at <2, or at a pH >9, preferably >10, more preferably >12, most preferably >13, respectively). Consequently, one object of the present invention is to design an improved regeneration protocol for matrices containing proteineous ligands, such as protein A- or G-matrices, or immunoaffinity-matrices.

The further objective is to provide a regeneration protocol that minimises the problems associated with the presence of adherent material in liquid samples to be applied to adsorbent matrices as defined above, preferably for regeneration of structures/matrices which are sensitive to hydrolysis i.e. in alkaline or acid aqueous media (at a pH <4, preferably <3, more preferably at <2 and at a pH >9, preferably >10, more preferably >12, most preferably >13 respectively). Consequently, another object of the present invention is to design an improved regeneration protocol for matrices containing proteineous ligands, such as protein A- or G-matrices, or immunoaffinity-matrices.

A further objective is to provide a regeneration protocol such that the break-through or total availability capacity is maintained at a sufficiently high level for at least 50 or at least 100 cycles. By the term "sufficiently high level" is meant that the break-through or total availability capacity after 50 cycles or 100 cycles should be at least 80% or 70%, respectively, of the break through or total availability capacity for the first cycle. The ultimate goal is that these percentage figures shall be 90–100% for both 50 and 100 cycles. Beside the break-through or total availability capacity, the binding capacity shall also maintained at an sufficient high level, which means that the dynamic binding capacity of an absorbent matrix after 50 cycles and/or 100 cycles should be at least 70%, preferably at least 80%, more preferred at least 90% of the dynamic binding capacity of a single used adsorbent matrix.

This objective in particular applies to adsorbent matrices in which the base matrix, the spacer and/or the binding structure comprise a hydrolysis sensitive structure of the kind mentioned above, i.e. is hydrolytically labile in alkaline or acid aqueous media (at a pH <4 and >9, respectively). This especially applies to matrices comprising peptide containing ligands, such as protein A- or G-matrices, or immunoaffinity-matrices.

Other objectives are application of the above mentioned objectives to processes in which either or both of the adsorption and desorption step is carried out as a chromatographic process or a batch wise process. The chromatographic process, in this context can be divided into processes that utilize (a) a porous monolith, and (b) porous or non-porous particles that (i) are packed to a bed, or (ii) are in the form of a fluidised (=expanded) bed.

By a chromatographic process is contemplated that the liquid passing through a bed defined by the adsorbent matrix is essentially a plug flow, i.e. the number of theoretical plates are >5, preferably >15. This in particular applies to matrices in of form of porous monolithic plugs and expanded and packed beds.

THE INVENTION

The term "removal of a substance" primarily means that the process is part of a protocol for purifying the substance. The term also includes that an undesired substance is removed from the liquid sample, which then is further processed in order to purify some other substance present therein.

By "polypeptide structure" is contemplated that two or more amino acids are linked in sequence by peptide bonds. By "nucleic acid structure" is contemplated a nucleotide sequence of at least two nucleotides. The term "structure/matrices" includes base matrices as well as ligands to be used in adsorbent matrices, preferably those mentioned in this application.

The terms "dynamic binding capacity" or binding capacity" define the amount of protein which can be bound to a chromatographic matrix when the value of 10% protein concentration of the load protein concentration is exceeding in the flow through of the column. The value of the dynamic binding or binding capacity, however, is to be estimated by using identical test solutions of a defined pH, conductivity and protein concentration.

The terms "break-through capacity" or "total available capacity" are defined by the actual (maximum) amount of protein which can be bound to a chromatographic matrix. As the value of the break-through or total available capacity of a adsorbent matrix depends on the pH, conductivity and protein concentration in the load (=test) solution, the break-through or total availability capacities is to be compared by using identical load solutions of a defined pH, conductivity and protein concentration.

The invention is based on the discovery that the above mentioned objectives can be met if the regeneration procedure makes use of an aqueous solution that is acid or alkaline and contains a water-miscible organic solvent. Consequently the present invention applies to a method for regeneration of an adsorbent matrix by contacting said adsorbent matrix with one or more regeneration solutions, characterized in that at least one of said regeneration solutions is aqueous and contains an organic solvent which is water-miscible and has a pH value $\leq 4$, preferably $\leq 3$ (acid solution) or $\geq 10$ but <13 (alkaline solution).

In a more preferred embodiment, the regeneration process is part of an adsorption process for removing a substance from a liquid sample, preferably aqueous and typically containing adherent substances. Therefore, the present invention also applies to an adsorption process for removing a substance from a liquid sample, preferably aqueous and typically containing adherent substances. The process comprises the consecutive steps of:

(i) providing an adsorbent matrix exhibiting a plurality of structures to which the substance is capable of binding;
(ii) contacting the liquid sample and the adsorbent matrix with each other under conditions permitting binding between the matrix and the substance;
(iii) optionally recovering the substance from the adsorbent matrix subsequent to step (ii) by using a release liquid;
(iv) regenerating the adsorbent matrix by the use of one or more regeneration solutions subsequent to step (iii);
(v) optionally repeating steps (ii)–(iv) with another liquid sample containing the substance by the use of the adsorbent matrix having been regenerated in step (iv).

There may also be one or more additional steps included, for instance
(a) an equilibration step prior to step (ii) and between steps (v) and (ii) if the process is cyclic,
(b) one or more washing steps between steps (ii) and (iii) or (iv), One of the main characteristic features thus is that at least one of said one or more regeneration solutions is aqueous and contains an organic solvent which is water-miscible and has a pH value $\leq 4$ such as $\leq 3.5$, $\leq 3.0$ $\leq 2.5$, $\leq 2.0$, $\leq 1.5$ and $\leq 1.0$ respectively or $\geq 10$ but <13, such as 10, 10.5, 11, 11.5, 12, 12.5. For the regeneration of hydrolytically sensitive matrices/structures as mentioned above, preferably having a proteineous ligand, the pH value of the regeneration solution should be in a range of about 4.0 to 1.5, or in a range of about 10 to 12.5. Since the adherent substances often are lipid-like and most organic solvents promote salt precipitation, the organic solvent should be selected such that the mix of organic solvent and water will have the proper lipohilic/hydrophilic balance.

The amount of the organic solvent in a regeneration solution is typically in the interval 2–75% (v/v), preferably in the interval 5–50% (v/v), more preferably in the interval 5–40% (v/v) with the highest preference for 10–30% (v/v). The organic solvent part of a regeneration solution may be a water-miscible mix of organic solvents.

The preferred organic solvent to be included in a regeneration solution is n- or isopropanol, with preference, n-propanol, most preferred in the interval 10–30% (v/v). Other potential solvents that may be present are other water-miscible alcohols (methanol, ethanol, t-butanol) and secondary butanol, isobutanol which potentially can be used together with other water-miscible organic solvents. Other potentially useful water-miscible organic solvents are N,N-dimethyl formide, dimethylsulfoxide, acetonitrile etc. In case the contemplated use of the substance to be removed (=purified) is as food, pharmaceuticals and other similar uses then it is preferred to select a pharmaceutically acceptable organic solvent. If the liquid samples contain cells, the solvent should not promote release of intracellular constituents that may assist the hydrolysis of the desired substance and/or create extra purification problems.

The hydrophilic-lipophilic balance of organic substances is often measured as HLB-values, i.e. the coefficient for partition of the substance between water and octane under standardised conditions. HLB-values can be used as a guideline for screening if a particular organic solvent might be useful. With respect to HLB-values, it is believed that the preferred organic solvents should have essentially the same HLB value as isopropanol or n-propanol or be a somewhat more lipophilic. In other words have a similar or stronger tendency to partition to octane compared to isopropanol or n-propanol, with the proviso that the solvent preferably also shall be miscible with water, at least together with one or more other organic solvents.

With respect to mixing different solvents and obtain useful mixes a general guideline is that the dielectric constant for the mix should be essentially within the interval for useful n-propanol/water mixes, for instance containing n-propanol in the relative amounts given above.

With respect to lowering the explosion risk there are advantages with selecting organic solvents that have vapour pressures higher than isopropanol or n-propanol.

If the method of the invention makes use of an acid solution as defined above this solution has a pH $\leq 4$, such as $\leq 3.5$, $\leq 3.0$ $\leq 2.5$, $\leq 2.0$, and $\leq 1.0$ respectively, preferably containing a buffering system in which the acid component has a pKa below 6, such as below 5, or below 4. In preferred aspects the invention utilizes a regeneration solutions that is acid as defined above, preferably by containing a buffering system that gives a pH value $\leq 3$. The acid components can be for example a phosphoric acid, a carboxylic acid such as a mono-, di- and tri- carboxylic acid, etc. Typical useful carboxylic acids are acetic acid, citric acid, malic acid etc. In the preferred variants, the buffering system is selected to contain a buffering component that also is part of the buffer used for equilibrating the adsorbent matrix and/or the liquid sample before loading onto the matrix. The optimal total concentration of the acid component plus the corresponding base can typically be found within the interval of 0.01–0.5 M, with preference for the interval 0.01–0.1 M. Moderately acid regeneration solutions having pH with the interval 1–4 (e.g. 1.5, 1.6, 1.7, 1.8, 1.9, 2.0, 2.1, 2.2, 2.3, 2.4, 2.5, 3.0, 3.5, and 3.7, respectively) are preferred for adsorbent matrices in which the ligand and/or the base matrix are sensitive for hydrolysis as discussed above.

Therefore the present invention also applies to a regeneration procedure for adsorbent matrices, in particular to protein A-, protein G-matrices, or immunoaffinity matrices, wherein the process is characterised by the use of a moderately acid regeneration solution comprising a water-miscible organic solvents, preferably n- or isopropanol and having a pH with the interval 1–4. In a more preferred embodiment, the moderate regeneration solution comprises 5–40% (v/v) n- or isopropanol and has and pH value of 1.6–2.4. In a further more preferred embodiment of the present invention, the moderate regeneration solution comprises 5–40% (v/v) n- or isopropanol and about 20–500 mM $H_3PO_4$, preferably about 20–100 mM $H_3PO_4$, more preferred about 20–50 mM $H_3PO_4$, and most preferred about 40 mM $H_3PO_4$. The use of such an inventive regeneration solutions allows to maintain the break-through or total availability capacity of the adsorbent at a sufficiently high level for at least 50 to at least 100 cycles. This means, that the break-through or total availability capacity after 50 cycles and/or 100 cycles, respectively, is at least 70%, preferably at least 80% of the break-through or total availability capacity for the first cycle. In a more preferred embodiment, the break-through or total availability capacity after 50 cycles or 100 cycles, respectively, is at least 90–100% of the break through or total availability capacity for the first cycle. In a further embodiment of the present invention, the use of any of the inventive regeneration solutions allows to maintain the dynamic binding capacity of an absorbent matrix after 50 cycles and/or 100 cycles above at least 70%, preferably above at least 80%, more preferred above at least 90%, even more preferred above at least 100% of the dynamic binding capacity said adsorbent matrix has for the first use.

If the method of the invention makes use of an alkaline solution as defined above this solution has a pH $\geq 10$ but <13. The acid components of the preferred buffering system for this solution has a pKa above 9 and is for instance composed of $HPO_4^{2-}/HPO_4^{2-}$, $H_2O/OH^-$, $HCO_3^-/CO_3^{2-}$, alkyl ammonium/alkyl amine pairs of different kinds etc. In the preferred cases the buffering system is selected to have a buffering component in common with the buffer used for equilibrating the adsorbent matrix and/or the liquid sample before loading onto the matrix. The optimal total concentration of the buffering system can typically be found within the interval of 0.01–0.5 M, with preference for the interval 0.01–0.1 M. Moderately alkaline regeneration solutions (13>pH$\geq$10) are preferred for adsorbent matrices in which the ligand and/or the base matrix are sensitive for hydrolysis as discussed above such as matrices having an proteineous ligand (e.g. affinity chromatography matrices such as protein A-, protein G-matrices, immunoaffinity matrices, etc.). Therefore the present invention also applies to a regeneration procedure for adsorbent matrices such as protein A-, protein G-matrices, or immunoaffinity matrices, respectively, which is characterised by the use of a moderately alkaline regeneration solution comprising a water-miscible organic solvents, preferably n- or isopropanol, and having a pH with the interval 10–12.5. In a preferred embodiment the moderate regeneration solution comprises 5–40% (v/v) n- or isopropanol and has and pH value of 10–12.5. In a further more preferred embodiment the moderate alkaline regeneration solution comprises 5 to 40% n- or isopropanol and sodium hydroxide in a concentration of about $\leq 100$ mM, preferably of about 5–40 mM, more preferred of about 5–20 mM, and most preferred of about 10–20 mM. The use of such an regeneration solutions allows to maintain the break-through capacity and/or the dynamic binding capacity of the adsorbent matrix at a sufficiently high level as mentioned above for at least 50 or at least 100 cycles.

In further preferred variants of the invention, both an acid solution and an alkaline solution are used consecutively in one, more or all of the cycles, preferably with the acid solution preceding the alkaline solution. The organic solvent is preferably always included in the first of them, i.e. in the preferred variants in the acid solution.

According to a more preferred embodiment, the present invention is based on the discovery that the above mentioned objectives can be met if the regeneration procedure makes use of at least two aqueous solutions, wherein a first regeneration solution is acid and contains a water-miscible organic solvent and a second regeneration solution is alkaline. Consequently according this embodiment the present invention applies to a method for regeneration of an adsorbent matrix comprising an proteineous ligand by contacting said adsorbent matrix with a first regeneration solutions, characterized in that said regeneration solution is aqueous and contains an organic solvent which is water-miscible and has a pH value $\leq 4$, preferably $\leq 3$ (acid solution) and contacting said absorbent matrix by a second regeneration solution characterized in that said regeneration solution is aqueous and has a pH value $\geq 10$ but $<13$.

In this context a regeneration process for an adsorbent matrix is preferred, comprising the steps:
  (i) contacting said adsorbent matrix with a first regeneration solution, wherein said regeneration solution is aqueous and contains an organic solvent which is water-miscible and has a pH value $\leq 4$, preferably $\leq 3$; and
  (ii) contacting said adsorbent matrix with second regeneration solution, wherein said regeneration solution is aqueous and has a pH value $\geq 10$ but $<13$.

In a more preferred embodiment, the regeneration process is part of an adsorption process for removing a substance from a liquid sample, preferably aqueous and typically containing adherent substances. Therefore, the present invention also applies to an adsorption process for removing a substance from a liquid sample, preferably aqueous and typically containing adherent substances. The process comprises the consecutive steps of:
  (i) providing an adsorbent matrix exhibiting a plurality of structures to which the substance is capable of binding;
  (ii) contacting the liquid sample and the adsorbent matrix with each other under conditions permitting binding between the matrix and the substance;
  (iii) optionally recovering the substance from the adsorbent matrix subsequent to step (ii) by using a release liquid;
  (iv) regenerating the adsorbent matrix by contacting said matrix with a first aqueous solution which comprises an organic solvent which is water-miscible and has a pH value $\leq 4$, preferably $\leq 3$ (acid solution) subsequent by a second aqueous solution which has an pH value $\geq 10$ but $<13$ (alkaline solution) subsequent to step (iii);
  (v) optionally repeating steps (ii)–(iv) with another liquid sample containing the substance by the use of the adsorbent matrix having been regenerated in step (iv).

In a preferred embodiment of this two-step regeneration process, the first regeneration solution is a moderate acid regeneration solution comprising 5–40% (v/v) n- or isopropanol and about 20–500 mM $H_3PO_4$, preferably about 20–100 mM $H_3PO_4$, more preferred about 20–50 mM $H_3PO_4$ and most preferred about 40 mM $H_3PO_4$. In a more preferred embodiment thereof, the concentration of n- or isopropanol is about 5–20%, preferably about 10% in said regeneration solution. Furthermore, it is preferred to use a second regeneration solution, comprising sodium hydroxide in a concentration of $\leq 100$ mM. Preferably, said second regeneration solution comprises about 5–100 mM sodium hydroxide, more preferred about 5–40 mM sodium hydroxide, even more preferred about 5–20 mM sodium hydroxide, and most preferred about 10 mM sodium hydroxide.

It has been shown, that the use of a alkaline regeneration solution (such as sodium hydroxide >10 mM) or a acidic regeneration solution (such as phosphoric acid) as a first regeneration step or a single-regeneration step leads to turbidity (precipitation) in the flowthrough of the column. Furthermore, a repeated cycling of a matrix, regenerated by the use of a alkaline regeneration solution (such as sodium hydroxide >10 mM) or a acidic regeneration solution as a first regeneration step or a single-regeneration step, due to an increased backpressure build up at the column and to a total blockage of the matrix within less than 10 cycles. Such a total blockage also has been shown when the first regeneration step is performed with a mixture of sodium hydroxide (>10 mM) and water-miscible organic solvents (e.g. ethanol or isoprobanol or n-propanol). It has further been shown that the use of an alkaline regeneration solution (e.g use of 0.1 M sodium hydroxide) as a first or second regeneration solution results in a gradual decrease of the breakthrough and dynamic binding capacity. The loss of total binding capacity has been shown to be more than 20% after less than 30 cycles. To the contrary, it has been shown that a regeneration procedure comprising a first regeneration step with a combination of an acidic solution which contains an organic solvent, preferably isoprobanol or n-propanol, and a second regeneration step with an alkaline solution, preferably 5–40 mM sodium hydroxide, results in a surprisingly effective regeneration of the matrix with no blockage of the column after more than 100 cycles. Moreover, it has been shown that a regeneration of the matrix with classical regeneration procedure e.g. using 6 M urea and subsequently 1 M acetic acid still results in residual contamination of the matrix. This residual contamination has been detected when the matrix, first applied to the 6 M urea/1 M acetic acid regeneration procedure, was post cleaned with a first aqueous solution which comprises an organic solvent which is water-miscible and has a pH value $\leq 4$, preferably $\leq 3$ (acid solution) subsequent by a second aqueous solution which has an pH value $\geq 10$ but $<13$ (alkaline solution).

In summary, use of acid or alkaline regeneration solutions which do not contain any water-miscible organic solvents (e.g. n- or isopropanol or ethonal) often lead to turbidity (precipitation) in the chromatography column during regeneration, which results normally in a non-usable chromatography column. This disadvantage can be avoided or overcome by using the inventive process of a two step regeneration procedure as described herein.

Moreover, it has been shown that sodium hydroxide concentrations >100 mM are associated with a higher loss of the break through or total availability capacity. This especially applies to affinity matrices which typically hydrolytic sensitive, such as protein A, protein G, or immunoaffinity chromatography matrices.

Although normally not needed there can for instance be a washing solution between these two solutions.

In another preferred variant the acid solution is used in each cycle and the alkaline solution is only used during certain of the cycles, for instance after one, two, three or more cycles during which the alkaline solution have not been used. In the similar fashion there may also be variants in which the alkaline solution is used in each cycle and the acid solution only during certain cycles.

In a preferred mode, each batch coming from a fermentor is divided into a predetermined number of sub-batches, for instance 2, 3, 5 etc. Each sub-batch is run as a separate cycle having a regeneration step in which the acid solution is used.

For the last sub-batch of a batch the acid solution is followed by the alkaline solution. For the next batch the sequence of cycles is repeated.

After a number of cycles comprising one or more of the above-mentioned regeneration solutions regeneration solutions having other compositions may also be used, for instance >0.05 M, such as >0.1 M, NaOH, urea or guanidinium hydrochloride. In cycles containing this kind of other regeneration solution, the acid and/or alkaline solutions may be excluded. Steps utilizing concentrated solutions of guanidinium hydro chloride, urea and NaOH ($\geq$0.1 M) are often called cleaning steps.

Using the regeneration procedures described herein adsorbent matrices may be cleaned from undesired contaminants and their binding properties and capacities may be regenerated over 50 to 100 life cycles. In this context a further inventive effect of the regeneration procedures is to inactivate microorganism like bacteria, yeasts, fungi, viruses and mycoplasma during the regeneration procedure. Both, the alkaline solution (pH $\geq$10 but <13) and the acid solutions ($\leq$pH 4) comprising an organic solvent, preferably n- or isopropanol in the interval of 2–75% (v/v) show antimicrobiological activity. Therefore, a further embodiment of the present invention also applies to a regeneration procedure as described above which is furthermore characterized in that the regeneration solutions used inactivates microorganisms. A preferred embodiment thereof is the inactivation of mycoplasma and enveloped viruses (e.g. herpes viruses or retroviruses) during the regeneration cycles. Most preferred is a regeneration procedure characterized in that mycoplasma will be effectively inactivated during the regeneration process. Tests to prove the inactivation of mycoplasma are well known in the art and, for example described in "Application of Surfactin for mycoplasma inactivation in virus stocks" In Vitro Cell Bev Biol Anim. 1997 June; 33(6): 414–5

The Adsorbent Matrix

This comprises a base matrix that may or may not comprise the binding structure. If the base matrix as such lacks binding structures it is derivatized to contain them. This preferably means covalent attachment or any other kind of binding that gives bonds of sufficient strength to resist the conditions that are used in the various steps of the instant innovative process, in particular in the regeneration step. If a ligand is attached via a spacer to a base matrix, the spacer is considered as part of the base matrix if not otherwise said.

The Base Matrix

Suitable base matrices are based on organic and/or inorganic material. The base matrix is preferably hydrophilic and in the form of a polymer, which is insoluble and more or less swellable in water. Hydrophobic polymers that have been derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinylalcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerization of monomers exhibiting groups which can be converted to OH, or by hydrophilization of the final polymer, e.g. by adsorption of suitable compounds, such as hydrophilic polymers.

Suitable inorganic materials to be used in base matrices are silica (including porous or non-porous glass), zirconium oxide, graphite, tantalum oxide etc.

Preferred base matrices lack groups that are unstable against hyrolysis, such as silan, ester, amide groups and groups present in silica as such. This in particular applies with respect to groups that are in direct contact with the liquids used.

The base matrix may be porous or non-porous. This means that the adsorbent matrix may be fully or partially permeable (porous) or completely impermeable to the substance to be removed (non-porous), i.e. the matrix should have a Kav in the interval of 0.40–0.95 for substances to be removed. This does not exclude that Kav may be lower, for instance down to 0.10 or even lower for certain matrices, for instance having extenders. See for instance WO 98/33572 (Amersham Pharmacia Biotech AB).

In another embodiment of the invention, the matrix is in the form of irregular or spherical or spheroid particles (beads) with sizes in the range of 1–1000 μm, preferably 5–50 μm for high performance applications and 50–300 μm for preparative purposes.

In another embodiment of the invention geometric forms of adsorbent matrices are monolithic variants, for instance in the form of membranes and plugs. Monolithic matrices are always porous.

The matrices may also have densities higher or lower than the liquid. This kind of matrices is especially applicable in large-scale operations for fluidised or expanded bed chromatography as well as for different batch wise procedures, e.g. in stirred tanks. Fluidised and expanded bed procedures are described in WO 92/18237 (upward flow, Amersham Pharmacia Biotech AB) and WO 92/00799 (downward or upward flow, Kem-En-Tek).

The term "hydrophilic matrix" means that the accessible surface of the matrix is hydrophilic in the sense that aqueous liquids are able to penetrate the matrix. Typically the accessible surfaces on a hydrophilic base matrix expose a plurality of polar groups for instance comprising oxygen and/or nitrogen atoms. Examples of such polar groups are hydroxyl, amino, carboxy, ester, ether of lower alkyls (such as ($-CH_2CH_2O-$)$_n$H where n is an integer).

Ligands

Typical ligands to be used in adsorbent matrices are capable of affinity binding (affinity adsorbing) the substance to be removed and are best represented by a member of an affinity pair. Well-known affinity pairs are (a) oppositely charged entities (ion exchange; the immobilised entity being selected among primary, secondary, tertiary and quaternary ammonium, sulphonate, sulphate, phosphonate, phosphate, carboxy etc groups),
(b) antibodies and antigens/haptens,
(c) lectins and carbohydrate structures,
(d) IgG binding proteins and IgG (Protein A and IgG, Protein G and IgG etc),
(e) pair of hydrophobic groups,
(f) polymeric chelators and chelates,
(g) complementary nucleic acids,
(h) cells and cell binding ligands, Affinity members also include entities participating in catalytic reactions, for instance enzymes, enzyme substrates, cofactors, co-substrates etc. Members of cell-cell and cell-surface interactions and a synthetic mimetics of bio-produced affinity members are also included. A further kind of ligands is able to create reversible covalent bonds during the adsorption step, for instance by containing so called reactive disulfides, —S—SO$_n$— where n is an integer 1 or 2 and the free bonds bind to saturated and/or unsaturated carbons.

In a preferred embodiment the invention accomplishes large benefits for ligands as mentioned above that comprise hydrolytically labile bonds, for instance an ester bond, an amide bond, a glycosidic bond or some other hydrolysis sensitive bond. In particular advantages may be accomplished in case the ligand comprises polypeptide structure, nucleic acid structure or oligo- or polysaccharide structure.

The Substance to be Removed/Purified

The substance is primarily bio-organic, for instance comprising polypeptide structure, nucleic acid structure including nucleotide structure, carbohydrate structure, lipid structure such as steroid structure, etc. Its molecular weight is typically above 1000 dalton.

The Liquid Samples

The liquid samples may derive from biological fluids of animal origin (from vertebrates, such as mammals, and from evertebrates) or of plant origin. Particular biological fluids from animals are blood, serum, urine, milk (including whey) etc and other fluids containing bioorganic substances. As discussed above large advantages can be accomplished with the invention if the sample contains lipid-like substances and/or other adherent substances. Illustrative samples originate from fermentation broths/liquids, such as from the culturing of cells. Typically the cultured cells originate from a vertebrate, such as a mammal, or from an invertebrate (for instance cultured insect cells such as cells from butterflies, beetles etc and/or their larvae), or a microbe (e.g. cultured fungi, bacteria, yeast etc). Included are also plant cells and other kinds of living cells, preferably cultured.

In case the liquid sample contains particulate matter it may be beneficial to utilise adsorbent matrices in form of particles that are fluidised by an upward flow. This kind of samples often derives from (a) a fermentation broth/liquid from the culture of cells, (b) a liquid containing lysed cells, (c) a liquid containing cell and/or tissue homogenates, and (d) pastes obtained from cells.

An original sample may have undergone a number of pretreatment steps before being applied in step (ii) above, e.g. dilution, concentration, desalting, removal of specific components, centrifugation, filtration, dialysis, ultrafiltration, pH-adjustments etc.

The invention is further defined in the appending claim and will now be illustrated by some examples.

EXAMPLES

Materials and Methods

Separation medium (adsorbent matrix): rProtein A bound to a cross-linked agarose based matrix containing metal particles as densifying agents (Streamline). rProtein is a a recombinantly produced Protein A variant. See WO 9717132 (Amersham Pharmacia Biotech AB) and WO97/17361 (Amersham Pharmacia Biotech AB). The medium is available from APBiotech AB, Uppsala, Sweden.

Column: HR10/30 (APBiotech AB) having an inner diameter of 1 cm and packed with medium to a bed height of 26–27 cm giving a bed volume 20.5–22.5 ml.

Chromatography System: ÄKTA FPLC XL (APBiotech AB, Uppsala, Sweden)

Liquid sample: A clarified fermentation broth containing a model monoclonal antibody and obtained from a CHO cell line producing the recombinant antibody. The concentration of the recombinant antibody was 2.5 mg/ml Example 1

| Buffers: | | | |
|---|---|---|---|
| Equilibration buffer | 25 mM Tris base | 150 mM NaCl | pH 7.4 |
| Wash buffer | 25 mM Tris base | 500 mM NaCl | pH 7.4 |
| Elution buffer | 25 mM Citric acid | 150 mM NaCl | pH 3.7 |
| Regeneration buffer 1 | 40 mM H$_3$PO$_4$ | 10% 1-propanol | |
| Regeneration buffer 2 | 10 mM NaOH | | |
| Guanidine HCl | 4 M | | |
| Storage buffer | 100 mM Na$_2$HPO$_4$ | 20% Ethanol | pH 7.4 |

| Operation: | |
|---|---|
| Equilibration buffer | 180 cm$^{-1}$, 5 bed volumes |
| Load | 90 cm$^{-1}$, 7 bed volumes |
| Wash buffer | 180 cm$^{-1}$, 3 bed volumes |
| Elution buffer | 180 cm$^{-1}$, 5 bed volumes |
| Regeneration buffer 1 | 180 cm$^{-1}$, 3 bed volumes |
| Regeneration buffer 2 | 180 cm$^{-1}$, 3 bed volumes |
| Guanidine HCl | 180 cm$^{-1}$, 3 bed volumes (final control for effectiveness) |
| Storage buffer | 180 cm$^{-1}$, 5 bed volumes |

In the over-lay for the chromatograms of five consecutive chromatographic runs, the recombinant antibody appeared as a peak of about 3000 mAU after 340–350 ml. The maximum of the peak of regeneration buffer 2 was about 100–150 mAU after 525 ml and drops slightly over the cycles. A much smaller peak could be seen for regeneration buffer 1 after about 460–470 ml.

A weak peak (about 1 mAU) for guanidine HCl control flushes could only be detected in extremely blown-up after about one bed volume. The weak peak is merely indistinguishable from the refraction effect of the high salt concentration during these flushes. This clearly demonstrates that the regeneration process using regeneration solution 1 and subsequent regeneration solution 2 is a highly effective process for the regeneration of adsorbent matrices.

Examples 2 and 3

| Buffers: | | | |
|---|---|---|---|
| Equilibration buffer | 25 mM Tris base | 150 mM NaCl | pH 7.4 |
| Wash buffer | 25 mM Tris base | 500 mM NaCl | pH 7.4 |
| Elution buffer | 25 mM Citric acid | 150 mM NaCl | pH 3.7 |
| Regeneration buffer 1 | 40 mM H$_3$PO$_4$ | 10% 1-propanol | |
| Urea | 6 M | | |
| Acetic acid | 1 M | | |
| Regeneration buffer 2 | 10 mM NaOH | | |
| Storage buffer | 100 mM Na$_2$HPO$_4$ | 20% Ethanol | pH 7.4 |

| Operation example 2: | |
|---|---|
| Equilibration buffer | 180 cm$^{-1}$, 5 bed volumes |
| Load | 90 cm$^{-1}$, 7 bed volumes |
| Wash buffer | 180 cm$^{-1}$, 3 bed volumes |
| Elution buffer | 180 cm$^{-1}$, 5 bed volumes |
| Regeneration buffer 1 | 180 cm$^{-1}$, 3 bed volumes |
| Urea | 180 cm$^{-1}$, 3 bed volumes |
| Acetic acid | 180 cm$^{-1}$, 3 bed volumes |
| Regeneration buffer 2 | 180 cm$^{-1}$, 3 bed volumes |
| Storage buffer | 180 cm$^{-1}$, 5 bed volumes |

-continued

Operation example 3:

| | |
|---|---|
| Equilibration buffer | 180 cm$^{-1}$, 5 bed volumes |
| Load | 90 cm$^{-1}$, 7 bed volumes |
| Wash buffer | 180 cm$^{-1}$, 3 bed volumes |
| Elution buffer | 180 cm$^{-1}$, 5 bed volumes |
| Regeneration buffer 1 | 180 cm$^{-1}$, 3 bed volumes |
| Regeneration buffer 2 | 180 cm$^{-1}$, 3 bed volumes |
| Urea | 180 cm$^{-1}$, 3 bed volumes |
| Acetic acid | 180 cm$^{-1}$, 3 bed volumes |
| Storage buffer | 180 cm$^{-1}$, 5 bed volumes |

The experiments were designed to investigate the effectiveness of regeneration buffers 1 and 2 compared to the regeneration with 6 M urea and 1 M acetic acid. After the antibody was eluted as described above, the column was treated with regeneration solutions, urea, and acetic acid one after the other as described in the operation sheets 2 and 3 (operation example 2 and 3). The areas under the elution peaks were added up for each experiment and set to 100% (=remaining AU).

Example 2: 65% of the remaining AU were eluted by regeneration buffer 1. 5% each of the remaining AU were eluted by the subsequent treatment with 6 M urea and 1 M acetic acid. The final treatment with regeneration buffer 2 resulted in an elution of 25% of the remaining AU. This clearly demonstrates, that the regeneration with regeneration buffer 1 results in a very effective column regeneration. The effectiveness can be increased by the combined regeneration process using regeneration buffers 1 and 2. Use of urea and acetic acid had only a small effect compared to regeneration buffer 1, and was less effective compared to the combined regeneration process using regeneration buffers 1 and 2.

Example 3: This experiment was performed to confirm the results of the experiment of example 2. In example 3 the column was first treated with regeneration buffers 1 and 2 before treated with 6 M urea and 1 M acetic acid. Nearly about 100% of the remaining AU was eluted by regeneration buffers 1 and 2. Subsequent treatment with 6 M urea and 1 M acetic acid showed a non sizable effect.

Example 4

| Buffers: | | | |
|---|---|---|---|
| Equilibration buffer | 25 mM Tris base | 150 mM NaCl | pH 7.4 |
| Wash buffer | 25 mM Tris base | 500 mM NaCl | pH 7.4 |
| Elution buffer | 25 mM Citric acid | 150 mM NaCl | pH 3.7 |
| Urea | 6 M | | |
| Acetic acid | 1 M | | |
| Regeneration buffer 1 | 20 mM NaOH | | |
| Storage buffer | 100 mM Na$_2$HPO$_4$ | 20% Ethanol | pH 7.4 |

Operation example 4:

| | |
|---|---|
| Equilibration buffer | 180 cm$^{-1}$, 5 bed volumes |
| Load | 90 cm$^{-1}$, 7 bed volumes |
| Wash buffer | 180 cm$^{-1}$, 3 bed volumes |
| Elution buffer | 180 cm$^{-1}$, 5 bed volumes |
| Urea | 180 cm$^{-1}$, 3 bed volumes |
| Acetic acid | 180 cm$^{-1}$, 3 bed volumes |
| Regeneration buffer 1 | 180 cm$^{-1}$, 3 bed volumes |
| Storage buffer | 180 cm$^{-1}$, 5 bed volumes |

This experiment was performed to confirm the results of the experiment of example 2. In example 4 the column was first treated with 6 M urea and 1 M acetic acid before treated with a regeneration buffer containing 20 mM NaOH. 72% of the total AU was eluated with the elution buffer. The first treatment with 6 urea resulted in an elution of 18.4% of the total AU. Second treatment with 1 M acetic acid reduced the AU to about 2.4%. By the final NaOH treatment about 7% of the total AU was recovered. This demonstrates, that the classical regeneration procedure was less effective. It has to be mentioned that a treatment with 20 mM NaOH without any other regeneration steps due to a blocking of the column.

Example 5

Column Life Time

Liquid sample: A clarified fermentation broth containing a model monoclonal antibody and obtained from a CHO cell line producing the recombinant antibody. The concentration of the recombinant antibody was 2.5 mg/ml

| Buffers: | | | |
|---|---|---|---|
| Equilibration buffer | 25 mM Tris base | 150 mM NaCl | pH 7.4 |
| Wash buffer | 25 mM Tris base | 500 mM NaCl | pH 7.4 |
| Elution buffer | 25 mM Citric acid | 150 mM NaCl | pH 3.7 |
| Regeneration buffer 1 | 40 mM H$_3$PO$_4$ | 10% 1-propanol | |
| Regeneration buffer 2 | 10 mM NaOH | | |
| Guanidine HCl | 4 M | | |
| Storage buffer | 100 mM Na$_2$HPO$_4$ | 20% Ethanol | pH 7.4 |

Operation:

| | |
|---|---|
| Equilibration buffer | 180 cm$^{-1}$, 5 bed volumes |
| Load | 90 cm$^{-1}$, 7 bed volumes |
| Wash buffer | 180 cm$^{-1}$, 3 bed volumes |
| Elution buffer | 180 cm$^{-1}$, 5 bed volumes |
| Regeneration buffer 1 | 180 cm$^{-1}$, 3 bed volumes |
| Regeneration buffer 2 | 180 cm$^{-1}$, 3 bed volumes |
| Guanidine HCl | 180 cm$^{-1}$, 3 bed volumes (final control for effectiveness) |
| Storage buffer | 180 cm$^{-1}$, 5 bed volumes |

The experiment was performed as set out in Experiment 1. The column life time regarding dynamic binding capacity was investigated for 100 cycles applying the described procedure including two flushes with 4 M guanidine HCl and 4 weeks storage in storage buffer. The dynamic binding capacity remained essentially constant for about 50 cycles. After 100 cycles the dynamic binding capacity was still 80% of the starting medium. A slight over-capacity to 110% at the start will permit a continuous use of the separation medium for more than 100 cycles at fixed loading conditions.

Example 6

Column Life Time

Liquid sample: A clarified fermentation broth containing a model monoclonal antibody and obtained from a CHO cell line producing the recombinant antibody. The concentration of the recombinant antibody was 2.5 mg/ml

| Buffers: | | | |
|---|---|---|---|
| Equilibration buffer | 25 mM Tris base | 150 mM NaCl | pH 7.4 |
| Wash buffer | 25 mM Tris base | 500 mM NaCl | pH 7.4 |
| Elution buffer | 25 mM Citric acid | 150 mM NaCl | pH 3.7 |
| Regeneration buffer 1 | 1 M acetic acid | | |
| Regeneration buffer 2 | 100 mM NaOH | | |
| Storage buffer | 100 mM Na$_2$HPO$_4$ | 20% Ethanol | pH 7.4 |
| Operation: | | | |
| Equilibration buffer | 180 cm$^{-1}$, 5 bed volumes | | |
| Load | 90 cm$^{-1}$, 7 bed volumes | | |
| Wash buffer | 180 cm$^{-1}$, 3 bed volumes | | |
| Elution buffer | 180 cm$^{-1}$, 5 bed volumes | | |
| Regeneration buffer 1 | 180 cm$^{-1}$, 3 bed volumes | | |
| Regeneration buffer 2 | 180 cm$^{-1}$, 3 bed volumes | | |
| Storage buffer | 180 cm$^{-1}$, 5 bed volumes | | |

It has been shown, that the use of an alkaline solution of 0.1 M sodium hydroxide as a first or second regeneration solution results in a gradual decrease of the breakthrough and dynamic binding capacity. The loss of total binding capacity was shown to be more than 20% after less than 30 cycles.

The invention claimed is:

1. Method for regeneration of adsorbent matrix with an proteineous ligand comprising the steps:
    (i) contacting said adsorbent matrix with a first regeneration solution, wherein said first regeneration solution is aqueous and comprises an organic solvent which is water-miscible and has a pH value $\leq 4$, and
    (ii) contacting said adsorbent matrix, after it was contacted with said first regeneration solution, with a second regeneration solution, wherein said second regeneration solution is aqueous and has a pH value $\geq 10$ but <13.

2. The method of claim 1 wherein said organic solvent of said first regeneration solution has a pH value of $\leq 3$.

3. The method of claim 1, wherein said regeneration process is integrated in an adsorption process for removing a substance from a liquid sample, said process comprising the consecutive steps of:
    (i) providing an adsorbent matrix exhibiting a plurality of structures to which the substance is capable of binding;
    (ii) contacting the liquid sample and the adsorbent matrix with each other under conditions permitting binding between the matrix and the substance;
    (iii) optionally recovering the substance from the adsorbent matrix subsequent to step (ii) by using a release liquid;
    (iv) regenerating the adsorbent matrix by contacting said matrix with a first aqueous solution which comprises an organic solvent which is water-miscible and has a pH value $\leq 4$, followed by a second aqueous solution which has an pH value $\geq 10$ but <13 (alkaline solution) subsequent to step (iii).

4. The method of claim 3, further comprised of step (v):
    (v) repeating steps (ii)–(iv) with another liquid sample containing the substance by the use of the adsorbent matrix having been regenerated in step (iv).

5. The method of claim 4, wherein step (v) performed at least 50 times and the break-through or total availability capacity of said adsorbent matrix is maintained at a level wherein the break-through or total availability capacity after 50 cycles is at least 70% of the break-through or total availability capacity for the first cycle.

6. The method of claim 5 wherein step (V) is performed at least 100 cycles and the total availability capacity of said adsorbent matrix is maintained at a level wherein the break-through or total availability capacity after 100 cycles is at least 70% of the break-through or total availability capacity for the first cycle.

7. The method of claim 1 wherein the water-miscible solvent constitutes 2–50% (v/v) of said first regeneration solution, and is comprised of iso-propanol or n-propanol.

8. The method of claim 1 wherein the first regeneration solution is comprised of a buffering system based on an acid having pKa below 6.

9. The method of claim 8 wherein said acid is chosen from phosphoric acid or carboxylic acid and the total concentration of the acid and the corresponding base being in the interval of 0.01–0.5 M.

10. The method of claim 8, wherein the first regeneration solution comprises about 20–500 mM H$_3$PO$_4$ and about 5–40% (v/v) n- or isopropanol.

11. The method of claim 1 wherein the second regeneration solution comprises about 5–40 mM sodium hydroxide.

12. The method of claim 11, wherein the process is performed as a chromatographic process, by chromatographic process wherein the relevant liquid/solution is contacted with matrix in a step proceeding in plug flow through the bed.

13. The method of claim 1, wherein mycoplasma, if present, are inactivated during the regeneration process.

14. The method of claim 1, wherein the adsorbent matrix is in the form of a porous monolith.

15. The method of claim 14, wherein the porous monolith is a porous membrane or a porous plug.

16. The method of claim 15, wherein the proteineous ligand is chosen from protein A, protein G, an antibody or an antigen.

17. The method of claim 16, wherein said ligand is protein A.

18. The method of claim 17, wherein said ligand is an antibody.

19. The method of claim 1, wherein the adsorbent matrix is in the form of a bed containing particles, such as bead, that are porous or non-porous, said bed being an expanded or a packed bed and wherein the matrix comprises a proteineous ligand.

* * * * *